(12) United States Patent
Lin et al.

(10) Patent No.: US 8,134,636 B2
(45) Date of Patent: Mar. 13, 2012

(54) AUTOFOCUSING OPTICAL SYSTEM USING TUNABLE LENS SYSTEM

(76) Inventors: Yi-Shin Lin, Dayuan Township (TW);
Hung-Chun Lin, Lugu Township (TW);
Hung-Wei Chen, Yongjing Township (TW); Yao-Tzung Wang, Jhubei (TW)

( * ) Notice: Subject to any disclaimer, the term of this patent is extended or adjusted under 35 U.S.C. 154(b) by 302 days.

(21) Appl. No.: 12/636,790

(22) Filed: Dec. 14, 2009

(65) Prior Publication Data
US 2011/0141341 A1    Jun. 16, 2011

(51) Int. Cl.
*H04N 5/232* (2006.01)
*G02F 1/13* (2006.01)
*G02F 1/00* (2006.01)

(52) U.S. Cl. ............... 348/345; 349/200; 359/322
(58) Field of Classification Search .......... 348/345, 348/360, 207.99; 349/200, 123–136; 359/245, 359/253, 321, 322; 396/72, 93
See application file for complete search history.

(56) References Cited

U.S. PATENT DOCUMENTS

| 7,369,327 | B1* | 5/2008 | Nishioka .............. 359/726 |
| 7,683,975 | B2* | 3/2010 | Kageyama .............. 349/33 |
| 7,859,640 | B2* | 12/2010 | Galstian et al. .............. 349/200 |
| 2006/0164593 | A1* | 7/2006 | Peyghambarian et al. ... 349/200 |
| 2007/0139333 | A1* | 6/2007 | Sato et al. .............. 345/90 |
| 2007/0216851 | A1 | 9/2007 | Matsumoto |
| 2008/0088756 | A1 | 4/2008 | Tseng et al. |
| 2008/0247743 | A1 | 10/2008 | Liang et al. |
| 2010/0053539 | A1* | 3/2010 | Lin .............. 349/200 |

OTHER PUBLICATIONS

Oleg Pishnyak, Susumu Sato, Oleg D. Lavrentovich, "Electrically tunable lens based on a dual-frequency nematic liquid crystal" Applied Optics vol. 45, No. 19/ Jul. 1, 2006, p. 4576-4582.
Mao Ye, et al. "Variable-Focus Liquid Crystal Lenses Used in Imaging Systems as Focusing Elements" IEICE Trans. Electron., vol. E91-C, No. 10, Oct. 2008, p. 1599-1603.

* cited by examiner

*Primary Examiner* — Nhan T Tran
(74) *Attorney, Agent, or Firm* — Ding Yu Tan

(57) ABSTRACT

A method for providing auto focus for camera module that is electrically tunable using liquid crystal optical element is provided. The liquid crystal optical element includes substrate layers, insulating layer, three electrodes, liquid crystal layer between the substrate layers, and voltages applied between electrodes to control the optical power of the liquid crystal layer. The liquid crystal layer is coupled onto a camera module for provide auto focus on object located between 10 cm to infinity, achieving a response time at most of about 600 milliseconds. Tuning for the predetermined focal length is provided for liquid crystal optical element when object is located between 10 cm to infinity.

20 Claims, 8 Drawing Sheets

AUTOFOCUSING OPTICAL SYSTEM USING TUNABLE LENS SYSTEM

FIELD OF INVENTION

This invention relates generally to a method for providing autofocusing for image focusing systems using one or more optical element functioning as a tunable focus lens, and in particular using liquid crystal optical elements functioning as tunable focus lens to an autofocus camera module incorporating one or more liquid crystal optical element having a plurality of electrodes, and to an autofocus digital camera module having a fixed-focus camera module portion and an autofocus camera module portion.

BACKGROUND OF THE INVENTION

The liquid crystal lens auto-focusing system has several advantages over the conventional mechanical-based auto-focusing systems, which utilize a plurality of mechanical moving parts so as to provide auto focusing, such as, for example, the ability to perform electrical tuning, having lower cost, lower power consumption, having simpler fabrication requirement, lighter weight, and reduced module height. Nevertheless, the conventional CCM module auto-focusing system possesses a plurality of disadvantages as well, such as: being polarization dependent, having slower response time, requiring relatively higher driving voltage, having the image quality dependent upon the applied voltage, having relatively smaller aperture size of less than 5 mm, and providing inadequate lens power.

To improve upon the performance of the conventional liquid crystal layer in providing image focusing for image capturing systems, the following have been attempted in the past including, for example: 1) cutting the liquid crystal layer into multiple layers so as to reduce the cell thickness of each liquid crystal layer to thereby achieve a faster liquid crystal response time at the same time, without having any net effect upon the lens power of the liquid crystal lens. However, this method has the disadvantages of having a complicated structure and is prone to damages; and 2) using a complicated voltage driving method, such as having a higher initial voltage pulse than the required working sustaining voltage, so as to achieve a faster liquid crystal response time. However, this particular method, although having reduced rise time, does not however make any significant improvement to the fall time; and at the same time it also has a complicated driving pattern, thereby leading to higher costs due to requiring a more complicated driving circuit for mobile device applications.

According to Reference 1: Optical Review, Vol. 6, pp. 471 (1999), which recites as follows: "[t]he thickness of the LC layer becomes extremely large at the center region of a convex lens-cell or at the peripheral part of a concave lens-cell, however, in comparison with that of a usual conventional LC display. This makes the response and recovery properties in this LC lens when applying and removing the driving voltage very slow. In addition, the transmission of incoming light is reduced according to the increase in thickness of the LC layer due to the absorption and/or scattering effect." Therefore, the disadvantages of conventional LC lens system include at least, for example, excessive thickness, slower response time, and reduced light transmission rate. In addition, Reference 2: Applied Optics, Vol. 45, pp. 4576 (2006) recites as follows: "[o]ne of the fundamental problems in the development of electrically controlled NLC lenses is their slow response. The NLC lens needs to be relatively thick for the sufficiently wide range of focus changes. However, by increasing the thickness d of the lens, one significantly increases the time needed for director reorientation, as . . . ." In other words, the disadvantages of conventional electrically controlled LC lens in regard to their slower response time and relatively thick lens for covering a wide range of focus changes are further taught in Reference 2. Moreover, Reference 3: Molecular Crystal and Liquid Crystals, Vol. 433, pp. 229 (2005) recites as follows: "[t]he thickness of the LC layer in an LC lens usually exceeds 100 μm and therefore the operation of an LC lens is generally very slow . . . ." In other words, Reference 3 teaches that the thickness of the LC layer is usually over 100 microns in thickness and it is thereby also too slow.

According to Reference 4: IEICE Trans. Electron., Vol. E91-C, 1599 (2008), which it recites as follow: " . . . , and is hopeful to be used in imaging systems, such as cell phone cameras and web cameras In this paper, the using of the LC lenses as focusing elements in image formation systems including a relay lens scope . . . " and "[i]t would be better if the aperture of the LC lens was equal to or larger than that of the TV lens (27 mm), but the focus range of an LC lens is inversely proportional the aperture area . . . ". Therefore, Reference 4 teaches that the focus range is inversely proportional to the aperture area, and that the recommended aperture should be equal or larger than 27 mm. Meanwhile, according to Reference 5: Optics Communications, Vol. 250, pp. 266 (2005) which recites: " . . . various kinds of structures have been proposed. The operation of an LC lens is generally very slow, which limits its applications in many areas . . . ", the shortcomings of the conventional LC lens with respect to slower response time are further illustrated.

Notwithstanding, it is known in the conventional art, for example, that the LCs have very slow response to external field, which is found, for example, in Reference 6: Jpn. J. Appl. Phys., Vol. 40, pp. 6012 (2001), which recites as follows: "[a]s is well known, although LCs have large optical and electrical anisotropies, which make them excellent optoelectronic materials, their response to external electric fields is extremely slow . . . ."

Teaching away from the use of hole-patterned design for LC lens systems is also evidenced, for example, in Reference 7: Jpn. J. Appl. Phys., Vol. 41, pp. L1232 (2002), which recites as follows: "[t]he problems associated with these LCLs are that either disclination lines occur easily, the operating speed is low, the size is too small, the optical quality is poor, or the adjustable parameters for quality improvement have not been defined."

As can be seen from many of the above cited references, operating issues such as slower response time, reduced light transmission, and/or excessive LC layer thickness as met by the conventional LCs systems have rendered them unable to meet the demands for commercial autofocusing digital camera modules for achieving adequate image quality within a focus range from 10 cm to infinity.

SUMMARY OF THE INVENTION

An aspect of the present invention is to provide a method for providing auto focus for image focusing systems using one or more liquid crystal optical elements. The liquid crystal optical elements are used to provide tunable focusing, while maintaining faster response time and adequate lens power for achieving a focus range from 10 cm to infinity.

Another aspect of the present invention is to provide a method for providing auto focus for image focusing systems that is tunable, while maintaining shutter speed at less than 1 second, and response time to be less than 700 milliseconds, while achieving focus range from 10 cm to infinity.

Another aspect of the present invention is to provide a designated distance between one of the principal points, for example, the distance between the rear principal point for the lens set (comprising one or more lenses) and the image sensor so as to modify or recalibrate the focal length to an object from a distance of infinity to be instead about 20 cm.

Another aspect of the present invention is to enable the liquid crystal optical element to function as both positive and negative lenses in the same cell through the adjustment of a plurality of voltages being applied on a plurality of electrodes so as to maintain adequate tunable focus adjustments.

The present invention relates generally to using one or more liquid crystal lenses to replace the auto focus function as provided in conventional CCM modules, which is by means of mechanical methods. As a result, auto focusing the liquid crystal lens can be realized through the use of electrical voltage inputs. Under adjustments of the corresponding distance between the sensor element and the object for image capture, which is located at a predetermined distance in the image plane, by utilizing the capability of the liquid crystal lens to perform both as a positive lens and as a negative lens, it is then possible to achieve faster response time for the liquid crystal lens. By using the liquid crystal lens for providing auto focus function, the overall system operation becomes simpler (because of having much lesser number of moving parts), and requiring lower electrical power consumption.

Through the tightening of the focus length specification with respect to requiring a shorter focus length with the CCM module, correspondingly, the required lens power for the liquid crystal lens becomes even higher, which then translate into greater liquid crystal cell thickness, reduction in response time. On the other hand, the proposed methods, devices, and/or systems according to a plurality of embodiments of the present invention make use of a change in the distance between the camera lens (as measured from the rear principal point, for example) and the image sensor as compared to that for conventional CCM modules, in conjunction with other elements and features as presented herein so as to afford sufficient auto focus capability under a focus distance range of 10 cm to infinity, having for example, reduced lens power requirements, thinner liquid crystal cell thickness, and thereby faster response time.

Various embodiments of the present invention can be used in image focusing systems, such as mobile phone camera modules, pico projectors, webcams, night vision systems of military applications, and other similar digital image applications etc.

The above and other aspects, features, and advantages of the present invention will become more apparent from the following detailed description when taken in conjunction with the accompanying drawings.

DETAILED DESCRIPTION OF THE INVENTION

Figure 1:
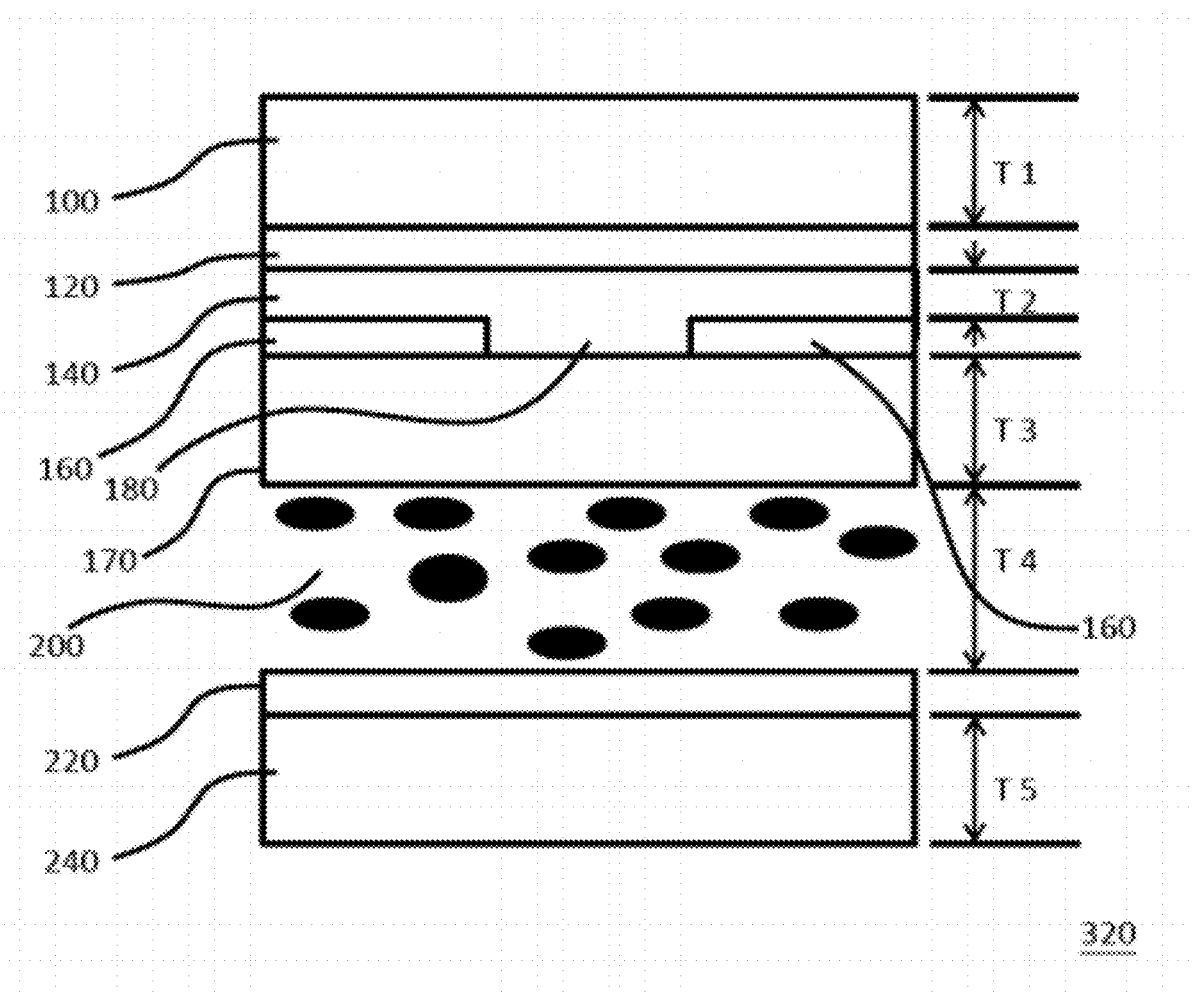
FIG. 1 is a cross-sectional view of an optical lens element using a liquid crystal lens element actuated under a dual voltage driving method according to a first embodiment of the present invention.
Figure 2:
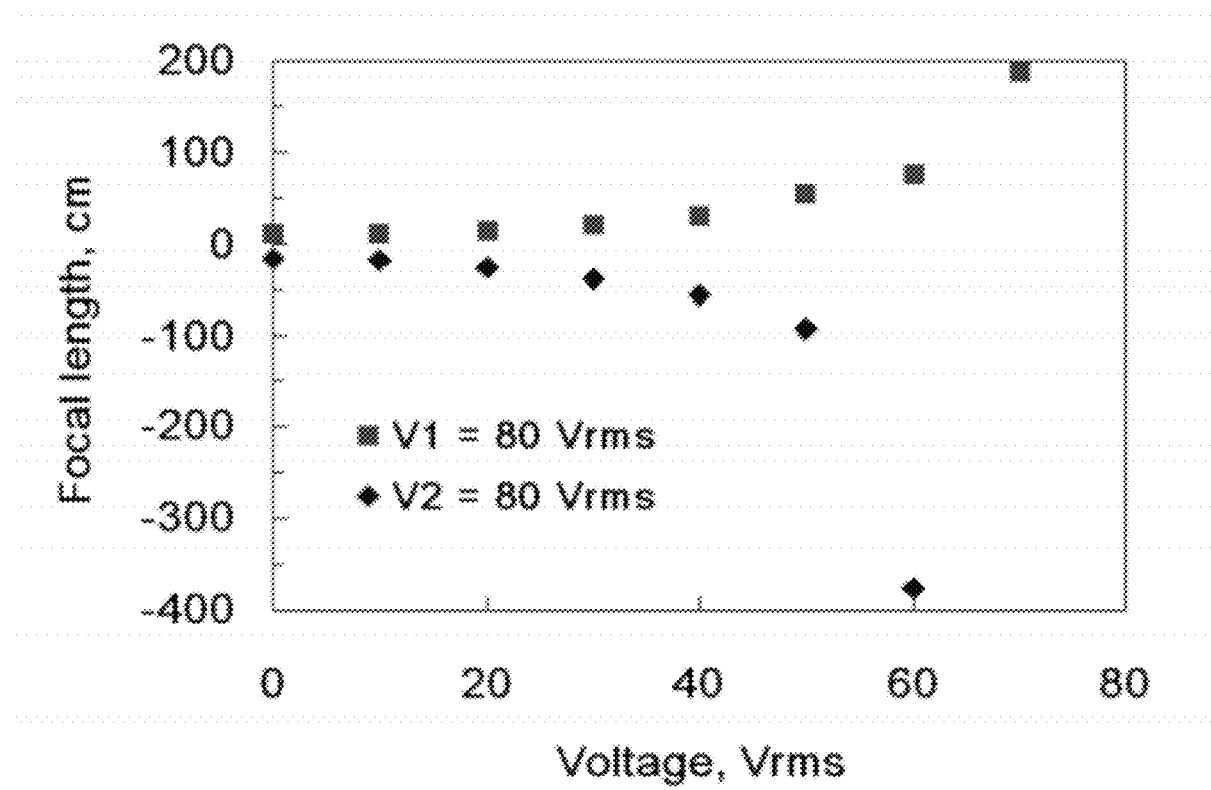
FIG. 2 is a chart illustrating a plurality of focal lengths which are achieved with respect to a first voltage and a second voltage being applied to the optical lens element using the liquid crystal lens element according to the dual voltage driving method according to the first embodiment of the present invention.

FIG. 1 is a cross-sectional view of an optical lens element using a liquid crystal lens element 320 actuated under a dual voltage driving method according to a first embodiment of the present invention. Please refer to FIG. 1 for the construction or fabrication of the liquid crystal lens element 320 actuated under the dual voltage driving method according to the first embodiment. In FIG. 1, a first substrate 240 has a thickness T5 of about 0.7 mm; and a first electrode 220 is disposed on the first substrate 240, and the first electrode 220 has a thickness of about 100 nm. A second substrate 170 is disposed under an insulation layer 140, and the second substrate 170 has a thickness T3 of about 0.7 mm; and a second electrode 160 of about 100 nm in thickness is disposed on the second substrate 170, and the second electrode 160 has a hole 180. An aperture, which is located in the hole 180, is of 2 mm. A liquid crystal layer 200 has between 12 microns to 25 microns in thickness T4; the thickness T4, which is also known as a predefined thickness, is provided between the first substrate 240 and the second substrate 170. The predefined thickness can range also from 10 microns to 100 microns. The liquid crystal layer 200 according to the first embodiment of the present invention is comprised of a material that is of a commercial grade liquid crystal material such as commercial grade liquid crystal materials with birefringence of 0.2 to 0.4, but preferably larger than 0.26 can also be used. Referring to FIGS. 1 and 2, a first voltage V1 is applied between the first electrode 220 and the second electrode 160 to control the orientation of the liquid crystal molecules. A third electrode 120 of about 100 nm in thickness is disposed on the insulating layer 140 and over the second electrode 160. A protective layer 100, which is made of glass, for example, is disposed on the third electrode 120. The third electrode 120 is configured to receive a second voltage V2 independent of the first voltage V1, in which the first voltage V1 has a fixed value that imparts optimal first-stage optical properties to the optical element; and the second voltage V2 is changed to vary the second-stage optical properties of the optical element, to thereby achieve improved optical properties. The optical lens element exemplified in the form of a liquid crystal lens element 320 is then firmly attached or coupled onto a camera module for providing the tunable focus functionality. Furthermore, the camera module can be implemented in the form of a CMOS image sensor camera or a CCD image sensor camera.

FIG. 2 illustrates the range of focal lengths which are achievable with respect to the first voltage V1 and the second voltage V2 being applied to the optical lens element using a liquid crystal lens element under the dual voltage driving method according to the first embodiment of the present invention. As shown in FIG. 2, the focal length has a positive range from +12 cm to positive infinity, and a negative range from −17 cm to negative infinity. Furthermore, FIG. 2 also shows the relationship between the two applied voltages, namely V1 and V2 measured in Vrms, and the corresponding focal length achieved, which are measured in centimeters.

According to a second embodiment, an experiment is performed in which the liquid crystal lens as provided in the first embodiment of the present invention is configured and firmly attached to the front of a conventional lens module. This lens module is, for example, a conventional web camera. An object for image capture is adjusted so as to be located at 20 centimeters away from the front of the camera module assembly, which includes the lens module and the liquid crystal lens being attached together. Then the object for image capture is moved closer to 10 cm away from the camera module assembly, because the image plane of the image formation does not match that of an image sensor, as a result, a blurry out-of-focus image is thereby produced. As the focal length of the liquid crystal lens is adjusted to a positive value, the image plane is then adjusted to match that of the image sensor so as to achieve a sharper-focused image. Later, the operation of the liquid crystal lens at a negative value is demonstrated. In this setup, a collection of distance cards are placed in a range of distances which are being measured from the front of the camera module, and they are each labeled with their corresponding distance values, such as 20 cm, 40 cm, 100 cm, 200 cm, and 300 cm, respectively. It is then visible and evident to an observer that the focal length achieved has moved to between 40 cm and 100 cm under a set of applied voltages while maintaining sufficient clarity and sharpness of the observed images of the distance cards.

According to a third embodiment of the present invention, the optical power of the liquid crystal optical element as discussed in the aforementioned embodiments with a predefined aperture can then be continuously tuned from +5 diopters to −5 diopters at a wavelength of about 532 nm.

Figure 3A:
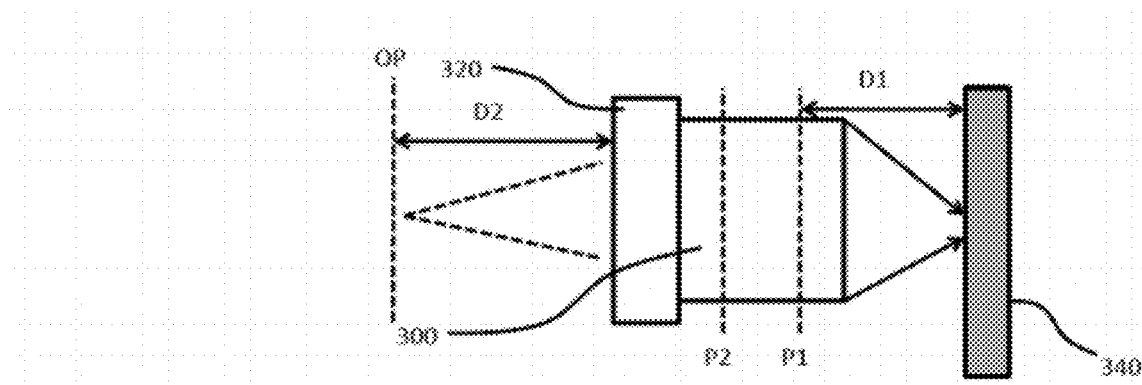
FIGS. 3a and 3b illustrate an autofocus compact camera module, which includes a fixed-focus camera module portion and an autofocus camera module portion, according to a fourth embodiment of the present invention.
Figure 3B:
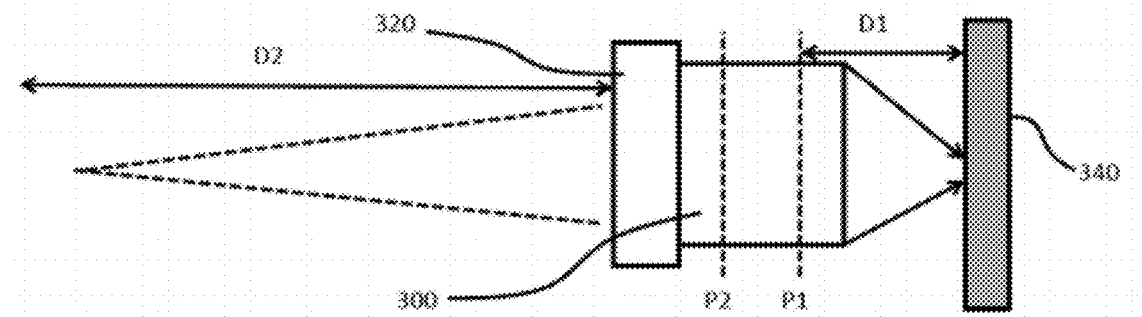

According to a fourth embodiment of the present invention, an autofocus compact camera module has a fixed-focus camera module portion and an autofocus camera module portion. Referring to FIGS. 3a and 3b, the fixed-focus camera module portion includes an image sensor 340, one or more lenses 300 for focusing an image onto the image sensor 340, a positioning structure (not shown in the drawing) for maintaining an alignment of the lenses 300 and the image sensor 340 to provide a desired image quality (image quality is assessed using MTF values as discussed herein), and an integrated circuit imager die (not shown in the drawing) in proximity to the lenses, the imager die containing at least one image capture microelectronic device. The lenses 300 can also be in the form of a lens system or lens group. Referring to FIGS. 3a and 3b, the distance between a rear principal point P1 of the lens group or lens system 300 and the image sensor 340 is defined to be D1, and D1 ranges from 1 mm to 2 mm in FIG. 3a and FIG. 3b. Meanwhile, the distance between a front principal point P2 of the lens group or lens system 300 and an object plane OP can be defined to be D3 (not shown in the drawings). According to the fourth embodiment of the present invention, P1 is adjusted to an optimal value of about 1 to 2 mm to provide for sufficient focus on the object, especially when the object is located at about 20 cm.

The autofocus camera module portion according to the fourth embodiment, for providing tunable focus capability, includes at least one processor configured to provide camera functionality, in which the at least one processor is communicatively coupled to the imager die, and a liquid crystal optical element 320 as exemplified in the first embodiment of the present invention. The adjustable focus function is provided on an object located between 10 cm to infinity by having the liquid crystal optical element 320 communicatively coupled to the at least one processor and the integrated circuit imager die; and a prearranged response time of at most about 600 milliseconds is provided by using a predetermined focal length for the liquid crystal optical element 320 and a predefined thickness T4 of the liquid crystal layer 200 for the liquid crystal optical element 320 of about 25 microns. The predefined thickness can range from 10 microns to 100 microns. As illustrated in FIGS. 3a and 3b, the liquid crystal optical element 320 is attached or coupled to the front of the lens 300 in the fixed-focus camera module portion, according to the fourth embodiment of the present invention.

Figure 3C:
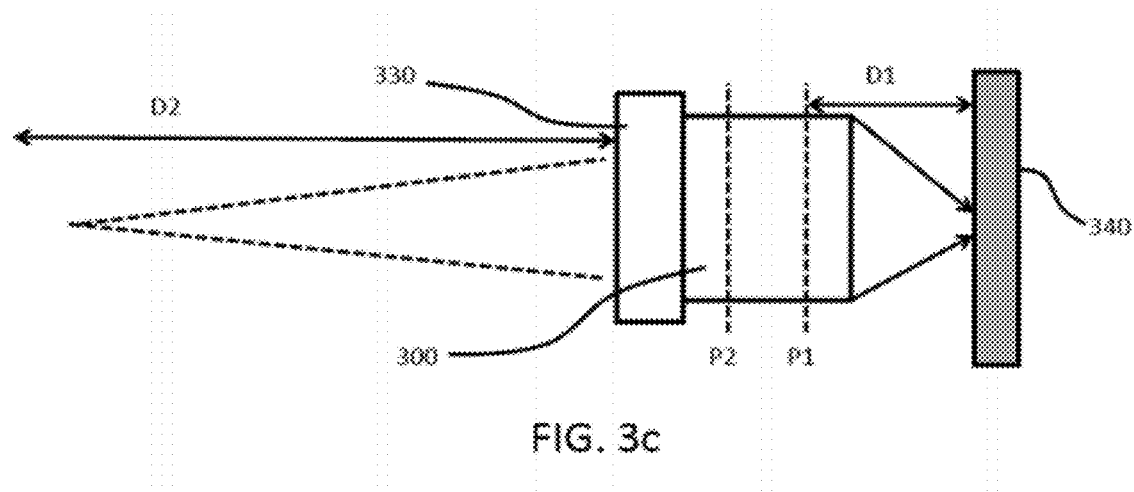
FIG. 3c illustrates an autofocus compact camera module, which includes an autofocus camera module portion according to a fifth embodiment of the present invention.

According to a fifth embodiment of the present invention, an autofocus compact camera module has a fixed-focus camera module portion and an autofocus camera module portion. Referring to FIG. 3c, the fixed-focus camera module portion includes an image sensor 340, one or more lenses 300 for focusing an image onto the image sensor 340, a positioning structure (not shown in the drawing) for maintaining an alignment of the lenses 300 and the image sensor 340 to provide a desired image quality (image quality is assessed using MTF values as discussed herein), and an integrated circuit imager die (not shown in the drawing) in proximity to the lenses, the imager die containing at least one image capture microelectronic device. The lenses 300 can also be in the form of a lens system or lens group. Referring to FIG. 3c, the distance between a rear principal point P1 of the lens group or lens system 300 and the image sensor 340 is defined to be D1, and D1 ranges from 1 mm to 2 mm. Meanwhile, the distance between a front principal point P2 of the lens group or lens system 300 and an object plane OP can be defined to be D3 (not shown in the drawings). According to the fifth embodiment of the present invention, P1 is adjusted to an optimal value of about 1 to 2 mm to provide for sufficient focus on the object, especially when the object is located at about 20 cm.

The autofocus camera module portion according to the fifth embodiment, for providing tunable focus capability, includes at least one processor configured to provide camera functionality, in which the at least one processor is communicatively coupled to the imager die, and a tunable focus lens 330 as exemplified in the fifth embodiment of the present invention. The tunable focus lens 330 for the autofocus camera module portion can be in the form of MEMS optical systems, or electrically controlled or optically controlled polymeric membranes. The adjustable focus function is provided on an object located between 10 cm to infinity by having the tunable focus lens 330 communicatively coupled to the at least one processor and the integrated circuit imager die; and a prearranged response time of at most about 600 milliseconds is provided by using a predetermined focal length for the tunable focus lens 330. The predefined thickness of the tunable focus lens 330 can range from 10 microns to 100 microns. As illustrated in FIG. 3c, the tunable focus lens 330 is attached or coupled to the front of the lens 300, according to the fifth embodiment of the present invention.

Figure 4:
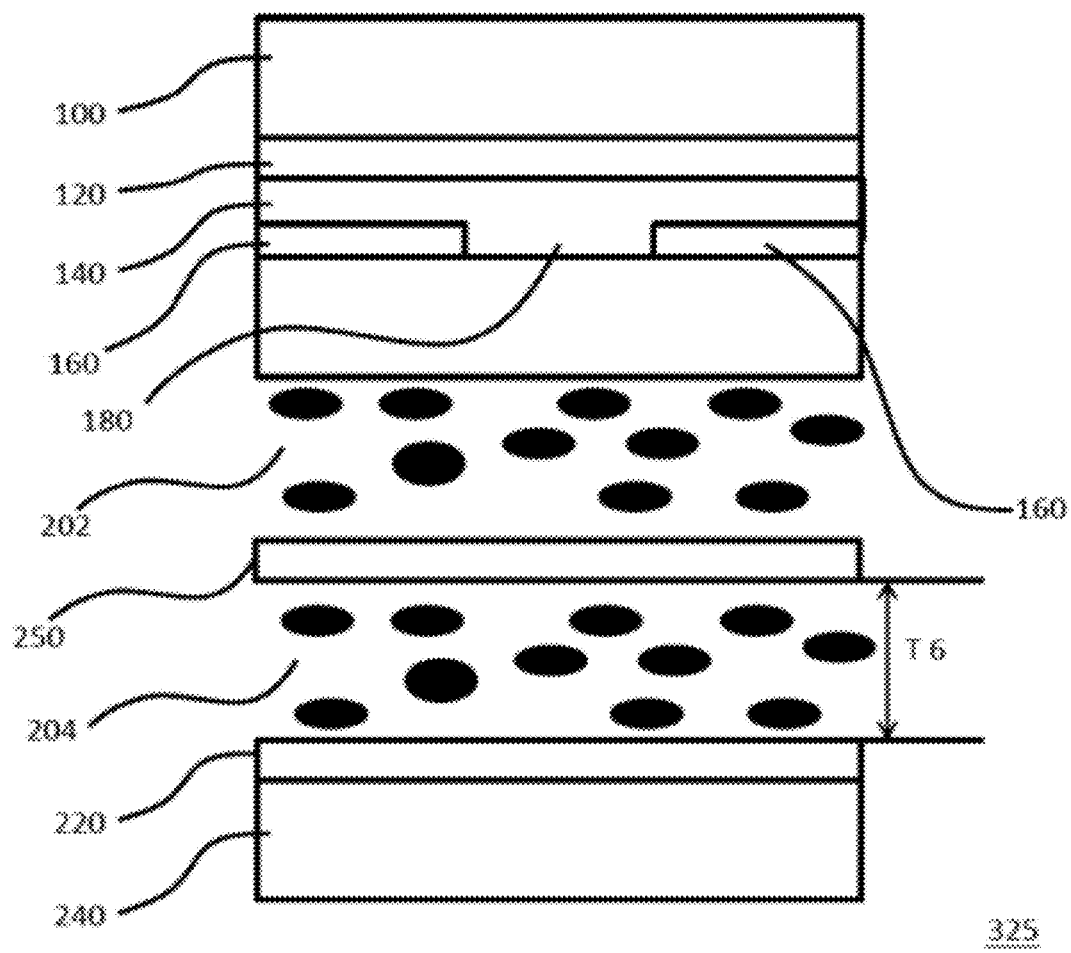
FIG. 4 is a cross-sectional view of an optical lens element having two liquid crystal lens layers separated by an insulating layer, according to a sixth embodiment of the present invention.

Furthermore, according to the sixth embodiment of the present invention, an optical lens element using the liquid crystal lens element 325 actuated under the dual voltage driving method in which the liquid crystal layer 200 is composed of a first liquid crystal layer 202, a second liquid crystal layer 204, and an insulating layer 250. The sixth embodiment is illustrated in FIG. 4. Referring to FIG. 4, the first and second liquid crystal layers 202 and 204 are spaced apart, with the insulating layer 250 being interposed between them. The insulating layer 250 can be in the form of a thin transparent glass layer or a polymeric layer.

Figure 5:
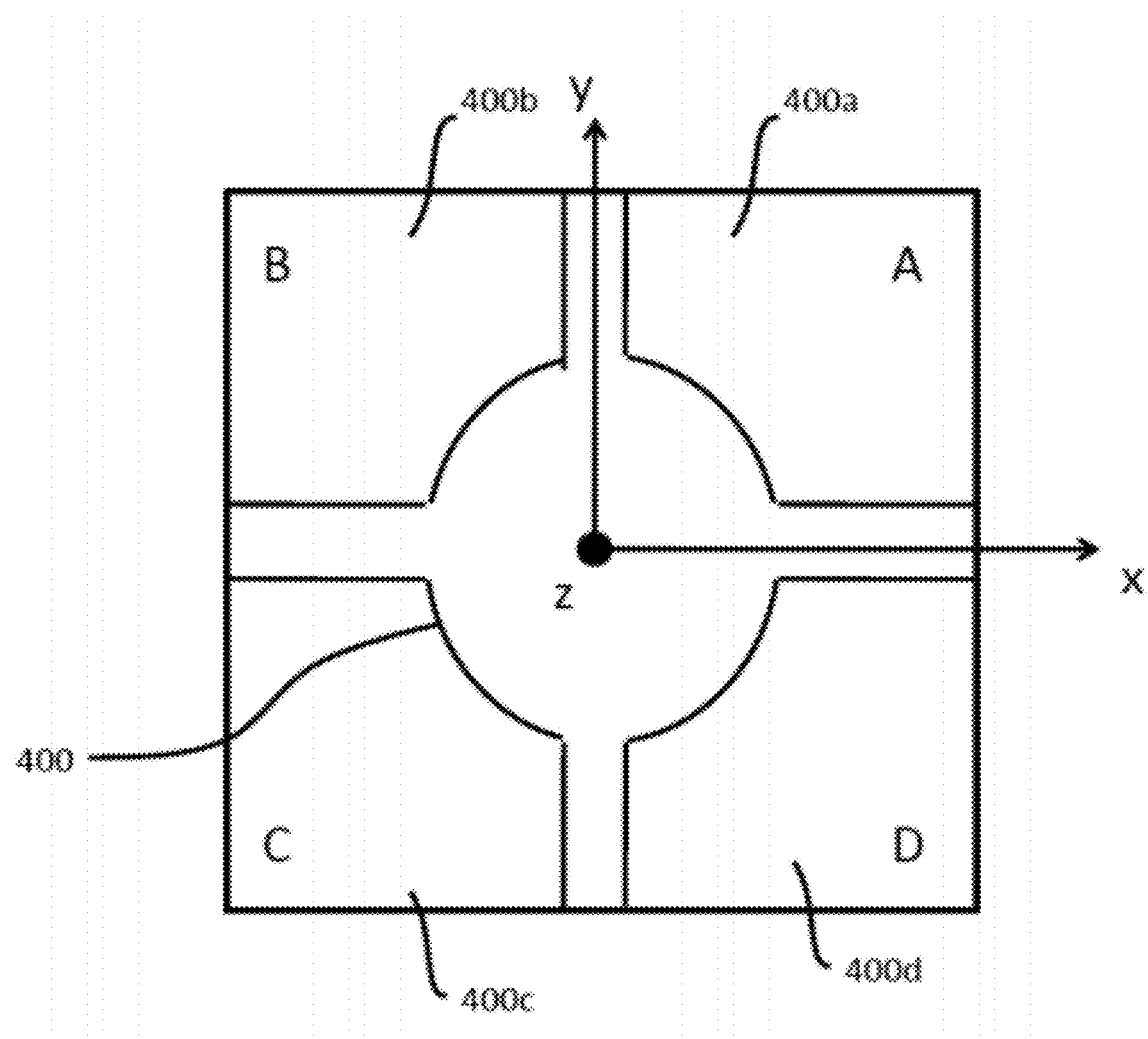
FIG. 5 illustrates a second electrode for the liquid crystal lens element being divided into multiple segments, in which the voltages applied to each of these electrode segments can be changed in accordance to specific requirements for improving optical performance with respect to auto-focusing for a camera module that is tunable, according to a seventh embodiment of the present invention.

Referring to FIG. 5, according to a seventh embodiment of the present invention, a second electrode 400 for the liquid crystal lens element 320, 325 for any of the aforementioned embodiment can be divided into four segments, namely 400a, 400b, 400c, and 400d, in which the voltages applied to each of these electrode segments can be changed in accordance to specific requirements for improving optical performance with respect to auto-focusing for a camera module that is tunable.

According to a eighth embodiment of the present invention, an optical lens element, similar to the one described in FIG. 4 and the sixth embodiment above, has the first liquid crystal layer 202 to be of a convex lens and the second liquid crystal layer 204 to be of a concave lens used in combination. This double layer LC can be used to solve typically at least two problems: 1) the polarization problem, in which orthogonal layer LC layers can realize a "polarizer-free LC lens"; 2) reduction of the cell gap and then boosting the response time. Furthermore, the double LC layers having one concave lens and one convex lens can be used for an "achromatic lens".

According to a ninth embodiment of the present invention, a projector is provided comprising an autofocus camera module that is tunable using the liquid crystal optical element as described in some of the above embodiments, in which the continuous focus tuning is achieved by means of performing image analysis using another camera module while capturing one or more images of the projected image.

Figure 7:
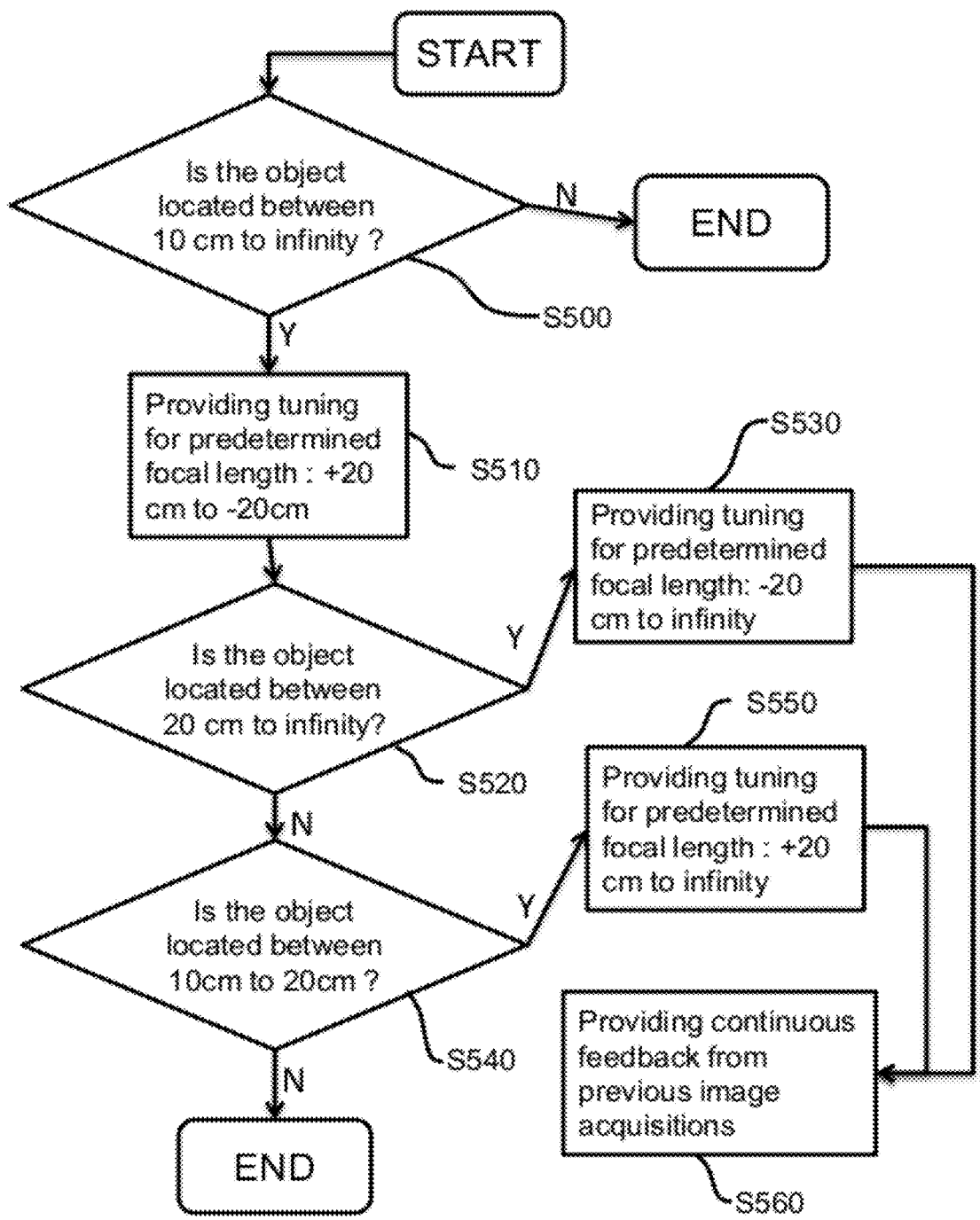
FIG. 7 illustrates a method for adjusting and tuning of the predetermined focal length for the liquid crystal optical element, according to various embodiments of the present invention.

According to the previous embodiments of the present invention, a prearranged response time of at most about 600 milliseconds can be obtained using a predetermined focal length for the liquid crystal optical element. Referring to FIG. 7, the predetermined focal length is tuned to between +20 cm to −20 cm (S510) when the object is located between 10 cm to infinity (S500). Then the predetermined focal length for the liquid crystal optical element can be adjusted or tuned from −20 cm to infinity (S530) when the corresponding object is located at infinity to 20 cm (S520). In addition, the predetermined focal length can be adjusted from +20 cm to infinity (S550) when the corresponding object is located at 10 cm to 20 cm (S540). Tuning of the predetermined focal length is thereby achieved by means of adjustments of the predetermined focal length.

Furthermore, referring again to FIG. 7, as exemplified in the previous embodiments, in step S560, continuous feedback are provided from a plurality of consecutive or nonconsecutive image acquisitions or captures for thereby improving upon the tuning of the predetermined focal length for the liquid crystal optical element 320, 325.

Figure 6:
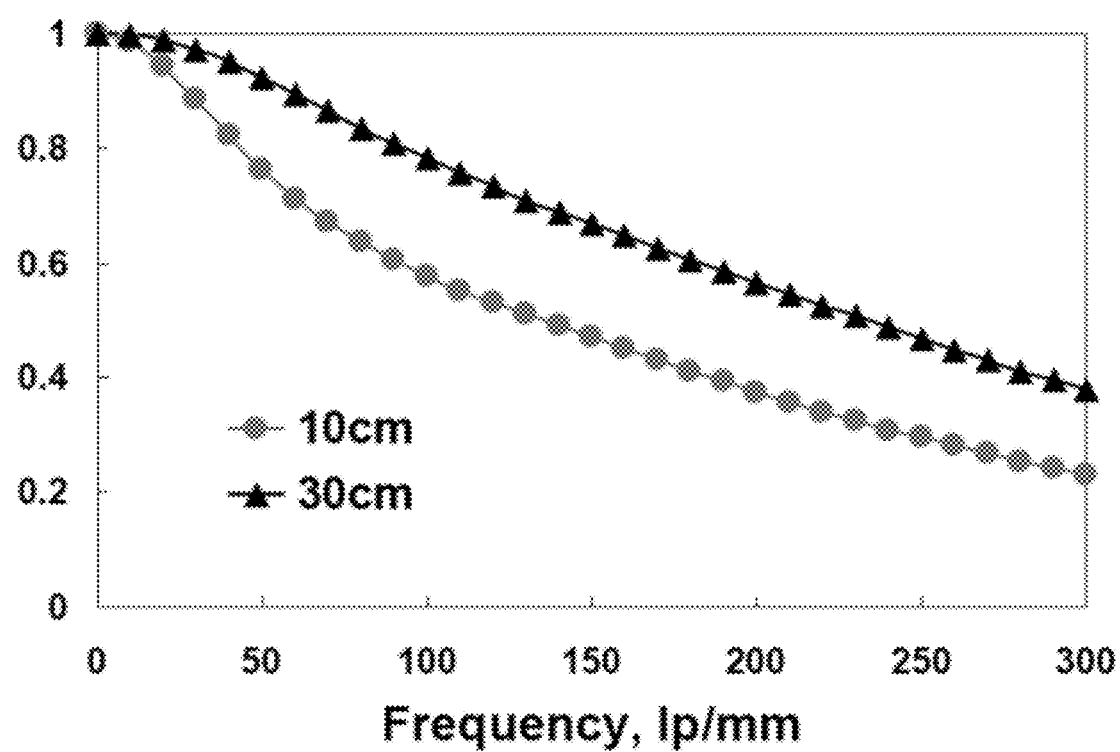
FIG. 6 shows the tabulation of a plurality of MTF values for the object plane with respect to each spatial frequency according to embodiments of as exemplified in FIGS. 3a, 3b, and 3c.

For the sake of quantifying resolution and image quality when assessing the performance of the various optical systems for various of the above embodiments of the present invention, a test procedure for determining resolution and image quality for the liquid crystal lens or liquid crystal lens element using MTF (MODULATION TRANSFER FUNCTION) values are as described below. The definition of MTF is:

$$MTF = \frac{I_{max}(f) - I_{min}(f)}{I_{max}(f) + I_{min}(f)} \tag{1}$$

where $I_{max}(f)$ and $I_{min}(f)$ are maximal and minimal levels of image illumination at a spatial frequency f. We measured MTF of the imaging camera module combined with a liquid crystal lens or liquid crystal lens element attached in the front of the lens module by using ImageMaster HR (Trioptics GMBH) which is the standard equipment for MTF measurement. FIG. 6 shows the measured MTF as a function of spatial frequency at the objective distances of 30 cm and 10 cm for the embodiments as exemplified in FIGS. 3a, 3b, and 3c As used herein in the aforementioned embodiments, the term "about" is defined as the range comprising from 10% greater than to 10% less than the indicated value.

Although many embodiments have been described above using liquid crystal lens as the optical element for functioning as tunable focus lens to an autofocus camera module, however, other embodiments in the form of liquid lenses, MEMS optical systems, or electrically controlled or optically controlled polymeric membranes may also be used (in lieu of the liquid crystal lens) as the optical element functioning as tunable focus lens to an autofocus camera module. Therefore, the fifth embodiment as exemplified in FIG. 3c can also take on characteristics and features as taught in FIGS. 1, 4, 5, and 6 to provide further more embodiments. Meanwhile, the dual voltage driving method, and the tabulation of MTF values for the object plane with respect to each spatial frequency as taught in FIGS. 2, and 6, respectively, may also be implemented under the fifth embodiment of the present invention.

Although the description above contains many specifics, these are merely provided to illustrate the invention and should not be construed as limitations of the invention's scope. Thus it will be apparent to those skilled, in the art that various modifications and variations can be made in the system and processes of the present invention without departing from the spirit or scope of the invention.

What is claimed is:

1. A method for providing auto-focusing for a camera module that is tunable, comprising:
   fabricating one or more liquid crystal optical elements for forming a liquid crystal layer, wherein each liquid crystal optical element comprising:
   a first substrate having a first electrode;
   a second substrate, and a second electrode disposed above the second substrate and having a hole;
   a liquid crystal layer provided between the first substrate and the second substrate;
   a first voltage applied between the first electrode and the second electrode to control an orientation of the liquid crystal molecules;
   a third electrode disposed on an insulating layer and over the second electrode and configured to receive a second voltage that is independent of the first voltage,
   wherein the first voltage has a fixed value that imparts optimal first-stage optical properties to the optical element; and the second voltage is changed to vary second-stage optical properties of the optical element; and
   attaching the liquid crystal layer onto the camera module;
   providing focus on an object located between 10 cm to infinity, wherein achieving a prearranged response time of at most about 600 milliseconds using a predetermined focal length for the liquid crystal optical element;

providing tuning for the predetermined focal length for the liquid crystal optical element from −20 cm to infinity when the object is located between 20 cm to infinity;

providing tuning for the predetermined focal length from +20 cm to infinity when the object is located between 10 cm to 20 cm;

providing tuning for the predetermined focal length to between +20 cm to −20 cm when the object is located between 10 cm to infinity; and providing continuous feedback from a plurality of image acquisitions for thereby improving upon the tuning of the predetermined focal length for the liquid crystal optical element.

2. The method as claimed in claim 1, wherein a predefined thickness of the liquid crystal layer is from 10 to 100 microns (μm).

3. The method as claimed in claim 1, wherein the distance between a rear principal point of the lens system and the image sensor for the camera module is adjusted to thereby recalibrate the focal length from infinity to be about 20 cm.

4. The method as claimed in claim 1, wherein the optical power of the liquid crystal optical element with a predefined aperture is continuously tuned from +5 diopters to −5 diopters at a wavelength of about 532 nm.

5. The method as claimed in claim 1, wherein a protective layer is disposed on the third electrode for each liquid crystal optical element.

6. The method as claimed in claim 1, wherein the second electrode is divided into four segments, and a plurality of voltages are applied to each of the electrode segments separately.

7. The method as claimed in claim 1, wherein the liquid crystal layer is composed of a first liquid crystal layer, a second liquid crystal layer, and an insulating layer disposed in between the first and second liquid crystal layers.

8. The method as claimed in claim 7, wherein the first liquid crystal layer is of a convex lens and the second liquid crystal layer is of a concave lens used in combination.

9. An autofocus camera module that is tunable, comprising:
a liquid crystal optical element, comprising:
a first substrate having a first electrode;
a second substrate,
a second electrode disposed above the second substrate and having a hole;
a liquid crystal layer provided between the first substrate and the second substrate;
a first voltage applied between the first electrode and the second electrode;
a third electrode;
an insulating layer;
wherein the third electrode is disposed on the insulating layer and over the second electrode and configured to receive a second voltage that is independent of the first voltage, and the first voltage is of a predetermined first voltage; and the second voltage is of a predetermined second voltage;
an adjustable focus function is provided on an object located between 10 cm to infinity; and a prearranged response time at most about 600 milliseconds is provided by using a predetermined focal length for the liquid crystal optical element;
wherein the predetermined focal length for the liquid crystal optical element is tuned from −20 cm to infinity when the object is located between 20 cm to infinity, and the predetermined focal length is tuned from +20 cm to infinity when the object is located between 10 cm to 20 cm; and the predetermined focal length is tuned to between +20 cm to −20 cm when the object is located between 10 cm to infinity, and the optical power of the liquid crystal optical element with a predefined aperture is then continuously tuned from +5 diopters to −5 diopters at a wavelength of about 532 nm.

10. The autofocus camera module as claimed in claim 9, wherein the predefined thickness of the liquid crystal layer is from 10 to 100 microns (μm).

11. The autofocus camera module as claimed in claim 9, wherein the distance between a rear principal point of a lens system and an image sensor for the camera module is adjusted to thereby recalibrate the focal length from infinity to be about 20 cm.

12. The autofocus camera module as claimed in claim 9, wherein the liquid crystal optical element further comprising a protective layer disposed on the third electrode.

13. The autofocus camera module as claimed in claim 9, wherein the second electrode is divided into four segments, and a plurality of voltages are applied to each of the electrode segments separately.

14. The autofocus camera module as claimed in claim 9, wherein the liquid crystal layer is composed of a first liquid crystal layer, a second liquid crystal layer, and an insulating layer disposed in between the first and second liquid crystal layers.

15. The autofocus camera module as claimed in claim 14, wherein the first liquid crystal layer is of a convex lens and the second liquid crystal layer is of a concave lens used in combination.

16. An autofocus digital camera module, comprising:
a fixed-focus camera module portion, comprising:
an image sensor;
one or more lenses for focusing an image onto the image sensor; and
a positioning structure for maintaining an alignment of the lenses and the image sensor to provide a desired image quality;
an integrated circuit imager die in proximity to the lenses, the imager die containing at least one image capture microelectronic device;
an autofocus camera module portion, comprising:
at least one processor configured to provide camera functionality, wherein the at least one processor is communicatively coupled to the imager die;
a liquid crystal optical element, comprising:
a first substrate having a first electrode;
a second substrate,
a second electrode disposed above the second substrate and having a hole;
a liquid crystal layer provided between the first substrate and the second substrate;
a first voltage applied between the first electrode and the second electrode;
a third electrode;
an insulating layer;
wherein the third electrode is disposed on the insulating layer and over the second electrode and configured to receive a second voltage that is independent of the first voltage, and the first voltage is of a predetermined first voltage; and the second voltage is of a predetermined second voltage;
an adjustable focus function is provided on an object located between 10 cm to infinity by having the liquid crystal optical element communicatively coupled to the at least one processor and the integrated circuit imager die; and a prearranged response time of at most about 600 milliseconds is provided by using a predetermined focal length for the liquid crystal optical element;

wherein the predetermined focal length for the liquid crystal optical element is tuned from −20 cm to infinity when the object is located between 20 cm to infinity, and the predetermined focal length is tuned from +20 cm to infinity when the object is located between 10 cm to 20 cm; and the predetermined focal length is tuned to between +20 cm to −20 cm when the object is located between 10 cm to infinity and the optical power of the optical element with a predefined aperture is then continuously tuned from +5 diopters to −5 diopters at a wavelength of about 532 nm.

17. The autofocus digital camera module as claimed in claim 16, wherein the predefined thickness of the liquid crystal layer is from 10 to 100 microns (μm).

18. The autofocus digital camera module as claimed in claim 16, wherein the distance between a rear principal point of the lenses and the image sensor is adjusted to thereby recalibrate the focal length from infinity to be about 20 cm instead.

19. The autofocus digital camera module as claimed in claim 16, wherein the liquid crystal optical element further comprising a protective layer disposed on the third electrode.

20. The autofocus digital camera module as claimed in claim 16, wherein the liquid crystal layer is composed of a first liquid crystal layer, a second liquid crystal layer, and an insulating layer disposed in between the first and second liquid crystal layers.

* * * * *